Patented Mar. 20, 1951

2,545,692

UNITED STATES PATENT OFFICE 2,545,692

RESIN-FORMING REACTION OF PHENOL, ALDEHYDE, AND AMINE IN PRESENCE OF POLYHALOPHENOL

Clyde E. Gleim, Akron, Ohio, assignor to Wingfoot Corporation, Akron, Ohio, a corporation of Delaware No Drawing. Application January 10, 1947, Serial No. 721,467

3 Claims. (Cl. 260—45)

This invention relates to the use of polyhalophenols as a catalyst in the reaction of a mixture of a phenol, an aldehyde and an amine and more particularly to the use of polyhalophenols as an agent for advantageously modifying the characteristics of the product resulting from the reaction of this mixture.

It has been discovered that the time required to complete the reaction of a mixture comprising a phenol, an aldehyde and an amine may be considerably reduced when the reaction is carried out in the presence of a polyhalophenol. It has been particularly observed that this catalytic function of the polyhalophenol is most pronounced when using a polyhalophenol containing at least 4 halogen atoms and not more than 5 halogen atoms. Therefore, the most desirable catalytical effect is observed when using those polyhalophenols containing 4 or 5 halogen atoms.

The catalytic characteristics of the polyhalophenols are observed when reacting a mixture containing any phenol, any aldehyde and any amine. These polyhalophenols do not appear to be catalytic when added to a phenol-aldehyde mixture which does not contain an amine. When the polyhalophenol is present in a concentration of as little as 0.005 mol and up about 0.15 mol per mol of reactants including the phenol and the amine, the effect observed is primarily to reduce the time necessary to bring the reaction to completion. It is preferred to use about 0.01 mol of the polyhalophenol per mol of the reactants when the effect desired is reduction in reaction time. Larger concentrations of polyhalophenol produces the same desired catalytic effect and, in addition, modifies the end product depending upon the amount of polyhalophenol employed. Therefore, when it is desired to modify the characteristics of the product resulting from the reaction of a mixture of a phenol, an aldehyde and an amine, then a catalytic quantity greater than 0.15 mol of the polyhalophenol should be used.

The molar ration of the phenolic compound to the amine compound in the presence of an aldehyde may vary from 1/100 to 100/1. Representative ratios of phenolic compound to amine compound are 1/80; 1/1; 10/1; and 4/1. The catalytic effect of the polyhalophenol is most pronounced when the phenol is present in an amount ranging from about 1/2 to 2/1 mol of the amine.

The ration of the aldehyde to the reactants, including the phenol and the amine, is not particularly limited. Usually, molar ratios of aldehyde to reactants are those ranging from about 3/4 to about 5/4. The particular amount of reactants to be employed is dependent in each case upon the type of product desired.

Any phenol may be used in carrying out the reaction of this invention and includes phenol, the cresols, phenol-cresol mixtures, the xylenols, resorcinol, hydroquinone, alpha naphthols, beta naphthols, etc.

Any aldehyde may be used, including formaldehyde, acetaldehyde, butyaldehyde, propionaldehyde, furfurylaldehyde, etc.

Any amine may be used, including the arylamines, such as aniline, o-, m-, or p-toluidines or mixed toluidines, p,p-diaminodiphenyl methane, etc.; the saturated cyclic amines such as cyclohexylamine; and the heterocyclic amines such as furfurylamine. The primary amines are of particular value.

The catalytic effect of these polyhalophenols is best illustrated by the following formulations in which 50 pounds of a phenol-aniline-formaldehyde resin was produced first without the aid of pentachlorophenol, and then using pentachlorophenol. Thus, a mixture comprising 0.50 mol of phenol, 0.5 mol of aniline, 0.84 mol of formalin (37% formaldehyde) and 2 ml. of 4 N sulfuric acid was reacted to completion in a total reaction time of 43–45 minutes. The addition of 0.01 mol of pentachlorophenol caused this same mixture to go to completion using the same conditions of heating in a total reaction time of only 17 minutes.

The following additional examples emphasize the value of the various polyhalophenols as catalysts in this reaction and the effect produced under varying conditions:

Table

| Ex. | Moles of Aniline | Moles of Phenol | 4N. $H_2SO_4$ Ml. | Catalyst Moles | Catalyst Kind | Moles of $CH_2O$ | Reaction Time in Minutes |
|---|---|---|---|---|---|---|---|
| 2  | 1.0 | None | 2    | 1.0  | p-chlorophenol          | 1.68 | A-40; C-65.   |
| 3  | 1.0 | 0.98 | 2    | 0.2  | 2,4-dichlorophenol      | 1.68 | A-40; C-60.   |
| 4  | 1.0 | 0.98 | 2    | .02  | 2,4,5-trichlorophenol   | 1.68 | A-37; C-52.   |
| 5  | 1.0 | 0.98 | 2    | .02  | 2,3,4,6-tetrachlorophenol | 1.68 | A-20; C-25. |
| 6  | 1.0 | 0.98 | 2    | .02  | 2,3,4,5,6-pentachlorophenol | 1.68 | A-20; C-25. |
| 7  | 1.0 | 0.98 | None | .02  | ___do___                | 1.68 | A-17; C-25.   |
| 8  | 1.0 | 0.95 | 2    | .05  | ___do___                | 1.68 | A-11; C-17.   |
| 9  | 1.0 | 0.90 | None | .1   | ___do___                | 1.68 | A-11; C-16.   |
| 10 | 1.0 | 0.98 | None | .02  | hexachlorophenol        | 1.68 | A-180; C-180. |
| 11 | 1.0 | 1.0  | None |      | $NH_4OH$                | 1.68 | A-50; C-65.   |
| 12 | 1.0 | 1.0  | 2    |      |                         | 1.68 | A-35; C-45.   |

The reaction time measured when using a polyhalophenol was first the total reaction time comprising the time elapsed from the moment the four components had been brought together until the desired product was produced and is indicated at C. The time elapsed from the time the mixture had first reached reflux conditions until the reaction was completed is indicated at A.

Best results with respect to total reaction time is obtained when using the tetra and penta chlorophenols, and particularly the 2,3,4,6-tetrachlorophenol, and the 2,3,4,5,6-pentachlorophenol. Less desirable results are produced when using the halophenols having less than 4 halo atoms.

As pointed out before, a catalytic quantity of the polyhalophenol greater than 0.15 mol per mol of reactants, may be successfully used. However, when these larger concentrations are used, the resulting resins are generally insoluble in the common organic solvents, a characteristic not observed when using catalytic amounts less than 0.15 mol of the polyhalophenol. This insolubilizing effect is noticed when about 0.15 mol or more of polyhalophenol is used per mol of reactants. However, these polyhalophenol modified phenolic resins are soluble in dilute alkalis. These resins containing the higher concentrations of polyhalophenols may be used as a spray or in powder form as an insecticide and as a "weed killer." These resins may also be used in coating compositions and find particular use in the molding art, and resist burning when heated.

The resins produced when using an amount smaller than about 0.15 mol of the polyhalophenol may be used in producing molded articles and as intermediates in the production of other useful resin-forming materials.

Suitable changes may be made in the details of the process without departing from the spirit or scope of the present invention, the proper limits of which are defined in the appended claims.

I claim:
1. The method of forming a resin which comprises reacting a mixture of phenol, an aldehyde and an amine selected from the group consisting of primary arylamines, cyclohexylamine, and furfuryl amine in the presence of a catalytic amount, from 0.005 to 0.15 mol per mol of reactants, of a polyhalophenol selected from the group consisting of tetrachlorophenol and pentachlorophenol.

2. The method of forming a resin which comprises reacting a mixture of phenol, formaldehyde, and aniline in the presence of a catalytic amount, from 0.005 to 0.15 mol per mol of reactants, of a polyhalophenol selected from the group consisting of tetrachlorophenol and pentachlorophenol.

3. The method of forming a resin which comprises reacting a mixture comprising .1 to 1 mol of phenol, formaldehyde, and .1 to 1 mol of an amine selected from the group consisting of primary arylamines, cyclohexylamine, and furfuryl amine in the presence of 0.005 to 0.15 mol of a polychlorophenol selected from the group consisting of tetrachlorophenol and pentachlorophenol.

CLYDE E. GLEIM.

REFERENCES CITED

The following references are of record in the file of this patent:

UNITED STATES PATENTS

| Number | Name | Date |
|---|---|---|
| 1,046,137 | Aylsworth | Dec. 3, 1912 |
| 1,215,072 | Steinmetz | Feb. 6, 1917 |
| 1,683,701 | Seebach | Sept. 11, 1928 |
| 1,994,753 | Cherry | Mar. 19, 1935 |
| 2,013,523 | Novak | Sept. 3, 1935 |
| 2,398,069 | Young | Apr. 9, 1946 |

FOREIGN PATENTS

| Number | Country | Date |
|---|---|---|
| 160,651 | Switzerland | May 16, 1933 |
| 572,857 | Great Britain | Oct. 26, 1945 |